(12) United States Patent
Yamaguchi et al.

(10) Patent No.: US 6,355,696 B1
(45) Date of Patent: Mar. 12, 2002

(54) POLYPROPYLENE RESIN PRE-EXPANDED PARTICLES

(75) Inventors: Takema Yamaguchi; Minori Yamaguchi, both of Akashi; Kenichi Senda, Hirakata, all of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/238,169

(22) Filed: Jan. 28, 1999

(30) Foreign Application Priority Data

Jan. 30, 1998 (JP) .......................................... 10-019135

(51) Int. Cl.$^7$ ................................................. C08J 9/16
(52) U.S. Cl. ........................... 521/56; 521/60; 521/143
(58) Field of Search .............................. 521/56, 60, 143

(56) References Cited

U.S. PATENT DOCUMENTS

| | | | | |
|---|---|---|---|---|
| 4,587,270 A | * | 5/1986 | Kuwabara et al. | 521/56 |
| 4,617,323 A | * | 10/1986 | Kuwabara et al. | 521/56 |
| 4,626,555 A | * | 12/1986 | Endo et al. | 521/60 |
| 4,695,593 A | * | 9/1987 | Kuwabara et al. | 521/56 |
| 4,720,509 A | * | 1/1988 | Nakamura | 521/56 |
| 4,761,431 A | * | 8/1988 | Nakamura | 521/56 |
| 4,777,000 A | | 10/1988 | Kuwabara et al. | 264/51 |
| 4,830,798 A | * | 5/1989 | Maeda | 264/53 |
| 4,840,973 A | * | 6/1989 | Kuwabara et al. | 521/56 |
| 4,948,817 A | * | 8/1990 | Kuwabara et al. | 521/56 |
| 5,053,435 A | * | 10/1991 | Kuwabara et al. | 521/56 |
| 5,071,883 A | * | 12/1991 | Kuwabara et al. | 521/60 |
| 5,229,049 A | * | 7/1993 | Maeda | 521/56 |
| 5,459,169 A | * | 10/1995 | Tokoro et al. | 521/56 |
| 5,744,505 A | * | 4/1998 | Fischer et al. | 521/56 |
| 5,747,549 A | * | 5/1998 | Tsurugai et al. | 521/60 |
| 5,883,141 A | * | 3/1999 | Mihayashi et al. | 521/56 |
| 6,013,687 A | * | 1/2000 | Wirobski et al. | 521/56 |
| 6,051,617 A | * | 4/2000 | Sasaki et al. | 521/60 |

FOREIGN PATENT DOCUMENTS

| | | | |
|---|---|---|---|
| DE | 3538477 | 5/1986 | |
| EP | 775772 | 5/1997 | |
| JP | 60-90228 | * 5/1985 | 521/56 |

* cited by examiner

Primary Examiner—Allan R. Kuhns
(74) Attorney, Agent, or Firm—Leydig, Voit, & Mayer, Ltd.

(57) ABSTRACT

Polypropylene resin pre-expanded particles having a weight of 0.3 to 1.8 mg per particle and a mean cell diameter of at most 250 μm and exhibiting two fusion peaks on a DSC curve thereof one of which appearing on a higher temperature side has a specific heat of fusion QH, which can be molded in a mold in a shortened molding time to give cellular molded articles having a low density of 25 g/liter or less after being provided with an inorganic gas pressure of at least 1.5 atms when the heat of fusion QH is 2.8 to 6.0 cal/g, or after being provided with an inorganic gas pressure of 1.18 to 1.5 atms when the heat of fusion QH is from 0.3 to less than 2.8 cal/g.

11 Claims, 1 Drawing Sheet

POLYPROPYLENE RESIN PRE-EXPANDED PARTICLES

BACKGROUND OF THE INVENTION

This invention relates to pre-expanded particles of a polypropylene resin suitable for the production of thermal insulation materials, cushioning packaging materials, returnable delivery boxes, automobile bumper cores and so on, and to a method of manufacturing polypropylene resin in-mold foamed articles from the pre-expanded particles.

Polypropylene in-mold foaming products are superior in chemical resistance, heat resistance and distortion restoration rate after compression as compared to polystyrene in-mold foaming products, and are superior in heat resistance and compression strength as compared to polyethylene in-mold foaming products. For these reasons they are widely used as cushioning packaging materials, returnable delivery boxes, automobile bumper cores, and others.

In recent years, efforts are being made in a wide range of fields for the purpose of improving productivity by shortening molding time in production so as to lower the cost of industrial products. There is a strong demand to shorten molding time also in the manufacture of polypropylene in-mold foamed articles to reduce costs. In the field of packaging materials, moreover, higher expansion ratios of foamed articles are being achieved, thereby reducing manufacturing costs.

Various techniques for shortening the molding time are known in the manufacture of in-mold foamed articles from polypropylene pre-expanded particles. For example, Japanese Patent Publication Kokai No. 61-103944 discloses expanded particles of a non-crosslinked polypropylene having a density of 8 to 100 g/liter and a particle diameter of 1 to 5 mm and containing 0.02 to 1 part by weight of organic sodium phosphate. However, in working examples thereof, when performing in-mold molding of the polypropylene expanded particles obtained, the particles are compressed to 50%, constituting a production disadvantage. Moreover, the density of most of the obtained polypropylene molded articles is as high as 40 g/liter or more, and no satisfactory molded article having a low density below 25 g/liter is produced. The only low density molded article having a density of 20 g/liter obtained therein using an ethylene-propylene random copolymer is inferior in surface properties. Japanese Patent Publication Kokai No. 8-20662 discloses a method wherein polypropylene expanded particles exhibiting a high temperature fusion peak, the heat of fusion of which is more than 3.5 cal/g and is not more than 6.0 cal/g, are compressed and filled in a mold in a compression ratio of 10 to 60% and heated with steam to produce a molded article. This method, however, is limited to only a compressive filling molding conducted at comparatively high compression ratios, and most of the obtained foams have a high density of 40 g/liter or more.

It is an object of the present invention is to provide pre-expanded particles of a polypropylene resin which can be molded in a old in a shortened molding time to give cellular molded articles having a low density and excellent properties such as surface properties, dimensional stability and weldability of particles.

A further object of the present invention is to provide a method r producing polypropylene in-mold foamed articles having a low density, excellent surface appearance, an excellent weldability of expanded particles and other excellent properties in a shortened molding time with a minimized shrinkability.

These and other objects of the present invention will become apparent from the description hereinafter.

SUMMARY OF THE INVENTION

It has now been found that, by regulating three parameters, namely the weight per particle of polypropylene resin pre-expanded particles, the heat of fusion QH (quantity of heat found from fusion peak area in a fusion curve) for a peak on the higher temperature side of two fusion peaks measured by differential scanning calorimetry (DSC), and the average diameter of cells in the pre-expanded particles, so as to keep those parameters within specific ranges, the cooling time required in the in-mold foaming can be shortened and, moreover polypropylene in-mold foamed articles having a low density can be obtained without any problem.

In accordance with the present invention, there is provided a pre-expanded particle of a polypropylene resin having a weight of 0.3 to 1.8 mg per particle, an average cell diameter of 250 $\mu$m or less, and a bulk density of 10 to 20 g/liter, wherein said pre-expanded particle shows two fusion peaks on a DSC curve when measured by differential scanning calorimetry (DSC) and the heat of fusion QH of the peak appearing on the higher temperature side is from 2.8 to 6.0 cal/g. The present invention also provides a method of manufacturing a polypropylene resin in-mold foamed article from such pre-expanded particles which comprises imparting a gas pressure of at least 1.5 atms to the pre-expanded particles by an inorganic gas, filling the particles in a mold capable of being closed but incapable of being hermetically sealed, and heating the particles with steam to fuse together, thereby giving a foamed article.

In accordance with another embodiment of the present invention, there is provided a pre-expanded particle of a polypropylene resin having a weight of 0.3 to 1.8 mg per particle and an average cell diameter of 250 $\mu$m or less, wherein said pre-expanded particle show two fusion peaks on a DSC curve when measured by DSC, and the heat of fusion QH of the peak appearing on the higher temperature side is from 0.3 cal/g to less than 2.8 cal/g. The present invention further provides a method of manufacturing a polypropylene resin in-mold foamed article from such pre-expanded particles which comprises imparting a gas pressure of 1.18 to 1.5 atms to the pre-expanded particles by an inorganic gas, filling the particles in a mold capable of being closed but incapable of being hermetically sealed, and heating the particles with steam to fuse together, thereby giving a foamed article.

DETAILED DESCRIPTION

Figure 1:
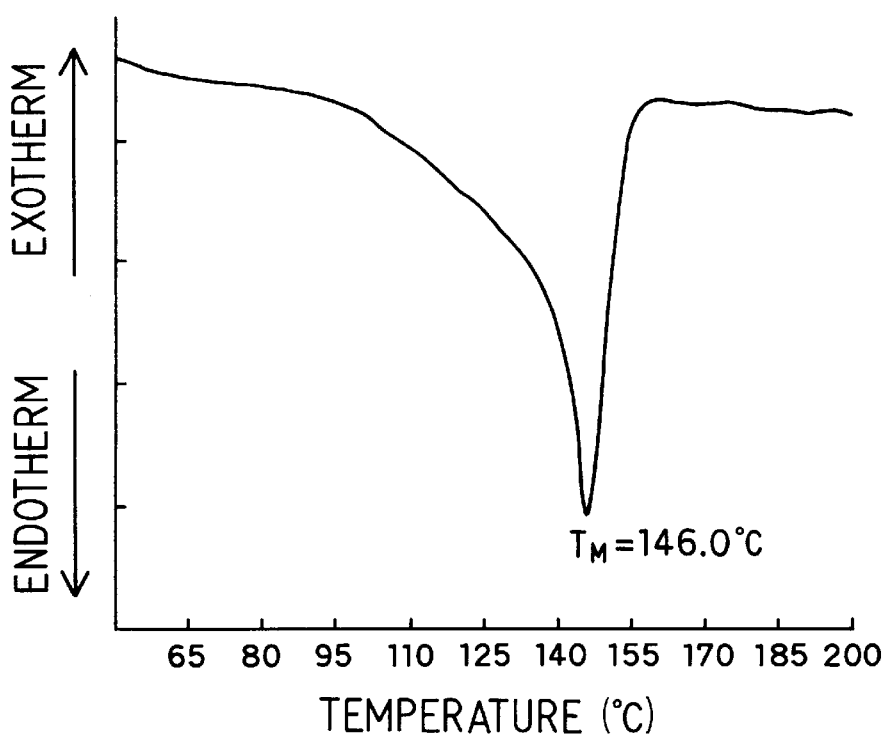
FIG. 1 is a graph showing determination of the melting point (TM) of an ethylene-propylene random copolymer (ethylene content 2.2% by weight, melt index MI 10 g/10 minutes) by DSC.

The weight per particle of the polypropylene resin pre-expanded particles according to the present invention is from 0.3 to 1.8 mg, preferably 0.5 to 1.3 mg, more preferably 0.7 to 1.0 mg. Molded articles can be obtained in a short molding time even when the per-particle weight is less than 0.3 mg, but this is not practical because of marked lowering in productivity in the manufacture of resin particles used as a raw material in pre-expansion. Likewise, molded articles can be obtained in a short molding time even when the per-particle weight is more than 1.8 mg, but conspicuous inter-particle gaps are formed in the surface of the molded articles, so molded articles having a satisfactory surface appearance cannot be obtained. By keeping the per-particle weight between 0.3 mg and 1.8 mg, molded articles having satisfactory surface properties can be obtained in a short molding time.

The polypropylene resin pre-expanded particles of the present invention have a mean cell diameter of at most 250 μm, preferably at most 200 μm. It is preferable that the mean diameter of the cells in the particles is at least 50 μm. Good molded products can be obtained even when the mean cell diameter is more than 250 μm, but the cooling time in the molding becomes long. The reason for this is assumed to be that, as the cell diameter becomes larger, the film forming the cells become thicker, thus making it difficult for a gas inside the molded products to disperse.

In case that the polypropylene resin pre-expanded particles which have a bulk density of 10 to 20 g/liter and a heat of fusion QH of high-temperature-side fusion peak of 2.8 to 6.0 cal/g are molded in a mold to produce foamed articles, the pre-expanded particles are provided with a gas pressure of at least 1.5 atms, and preferably at most 2.5 atms, by means of an inorganic gas, filled in a mold capable of enclosing the particles but incapable of being hermetically sealed, and heated with water steam to fuse together to thereby produce cellular molded articles having a shape true to the mold. In this case, if the internal gas pressure provided to the pre-expanded particles is lower than 1.5 atms, a sufficient secondary expansion force (expandability) required for the molding is not obtained, thus resulting in production of molded articles which are poor in melt adhesion between particles and will all have irregular surfaces. By imparting a gas pressure of 1.5 atms or higher, molded articles can be obtained which have good melt adhesion and good surface properties. Satisfactory molded articles can be obtained even if the heat of fusion QH of the peak on the higher temperature side is less than 2.8 cal/g, but the secondary expansion force of the particles during molding becomes large, resulting in longer cooling time after fusing together the particles. By regulating the heat of fusion QH of the peak on the higher temperature side to at least 2.8 cal/g, the secondary expansion force of the particles in the molding is suppressed, so the cooling time required in molding is shortened. On the other hand, if the heat of fusion QH of the high-temperature-side fusion peak exceeds 6.0 cal/g, the secondary expansion force of the pre-expanded particles is decreased and, therefore, the compression ratio of the particles to be filled in a mold must be increased to raise the expandability, so it becomes very difficult to obtain molded articles of low density.

In case of molding the polypropylene resin pre-expanded particles whose high-temperature-side fusion peak has a heat of fusion QH between not less than 0.3 cal/g and less than 2.8 cal/g, the pre-expanded particles are provided with a gas pressure of 1.18 to 1.5 atms by means of an inorganic gas, filled in a mold capable of enclosing the particles but incapable of being hermetically sealed, and fused together in the mold by heating with water steam to produce molded articles true to the mold. In this case, if the internal gas pressure imparted to the pre-expanded particles is lower than 1. 18 atms, an adequate secondary expansion force is not realized during molding, thus resulting in production of molded articles which are poor in melt adhesion between the particles and all have irregular surfaces. On the other hand, satisfactory molded articles can be obtained even when the internal pressure exceeds 1.5 atms, but the cooling time in molding becomes long, which is undesirable. In case of the pre-expanded particles whose high-temperature-side peak has a heat of fusion of 0.3 to less than 2.8 cal/g, molded articles having good melt adhesion and good surface properties are obtained by imparting a gas pressure of 1.18 to 1.5 atms to the particles. It is preferable that the heat of fusion QH of the high-temperature-side fusion peak for such polypropylene resin pre-expanded particles is 1.5 cal/g or more but less than 2.8 cal/g. If the heat of fusion QH of the high-temperature-side fusion peak is less than 0.3 cal/g, shrinkage of expansion-molded articles after molding is large, so molded articles having satisfactory surface properties cannot be obtained. On the other hand, if the heat of fusion QH of the high-temperature-side fusion peak exceeds 2.8 cal/g, the secondary expansion force (expandability) of the pre-expanded particles is decreased and, therefore, the compression ratio of the particles to be filled in a mold must be increased to raise the expandability, so it becomes very difficult to produce molded articles of low density. In this method, it is preferable that the polypropylene resin pre-expanded particles have a bulk density of 10 to 20 g/liter.

According to the present invention, as described in the foregoing, by regulating the weight per particle, heat of fusion QH for the high-temperature-side fusion peak and average cell diameter of the polypropylene resin pre-expanded particles within the specific ranges, the cooling time in molding can be shortened and, moreover, expansion-molded articles having a high expansion ratio such that the density is 25 g/liter or less can be obtained.

Examples of the polypropylene resin used in the present invention as a base resin of the pre-expanded particles are, for instance, propylene homopolymer, ethylene-propylene random copolymers, ethylene-propylene block copolymers, ethylene-propylene-butene random terpolymers, propylene-vinyl chloride copolymers, propylene-butene copolymers, propylene-maleic anhydride copolymers, and other known propylene-based resins. Polypropylene resins prepared by a stereospecific polymerization method are preferred. These may be used alone or in admixture thereof. Of these, it is particularly preferable to use ethylene-propylene random copolymers because of their high versatility. The term polypropylene resins or polypropylene as used herein means a polymer containing at least 80% by weight of propylene.

It is preferable that these polypropylene resins be in a non-crosslinked state, but it is nevertheless permissible that they be crosslinked by a peroxide or radiation. It is also permissible to use polypropylene resins with other thermoplastic resins compatible therewith, within such range that the properties of the polypropylene resins are not lost. Such other thermoplastic resins include, for instance, low density polyethylene, linear low density polyethylene, polystyrene, polybutene, and ionomer. When a polypropylene resin is used in combination with other polyolefins such as low density polyethylene, linear low density polyethylene, polybutene or ionomer, these other polyolefins are used in an amount of at most 20 parts by weight, preferably from 5 to 20 parts by weight, per 100 parts by weight of the polypropylene resin. A polystyrene is used in an amount of at most 10 parts by weight, preferably from 5 to 10 parts by weight, per 100 parts by weight of the polypropylene resin.

The polypropylene resins are usually processed into a desired particulate shape so as to make it easier to use in pre-expansion, for example, by melting in extruder, kneader, Banbury mixer or mixing rolls, and forming into particles having a desired shape, such as column, prolate spheroid, sphere, cube or rectangular parallelopiped, and having a mean particle size of 0.1 to 5 mm, preferably 0.5 to 3 mm.

The pre-expanded particles of the present invention exhibit two fusion peaks when measured by DSC. The relationship between the two fusion peaks is not particularly limited. However, it is preferable that the difference in temperature between the two fusion peaks is from 10 to 25° C., since the pre-expanded particles are easily fused together when heated for molding in a mold. The two fusion peaks of the pre-expanded particles vary depending on molecular structure of resin, thermal history of resin, quantity of blowing agent, expansion temperature, expansion pressure and the like. The difference in temperature between the two fusion peaks becomes larger when the polypropylene resin particles are pre-expanded on a higher temperature side. The fusion peak on the low-temperature side ranges between 125° C. and 155° C., while the fusion peak on the high-temperature side usually ranges between 145° C. and 175° C., differing with the type of polypropylene resin used.

There is no particular limitation in the method for producing the polypropylene pre-expanded particles of the present invention which have a heat of fusion QH of 0.3 cal/g or higher, or, alternatively, 2.8 cal/g or higher, and known methods are applicable. For example, the pre-expanded particles are produced by a method comprising impregnating base resin particles, namely polypropylene resin particles, with a volatile blowing agent in a pressure vessel, dispersing the particles in water with stirring, heating under pressure to a prescribed expansion temperature, and releasing the dispersion into a low pressure zone to thereby expand the particles.

As noted above, the heat of fusion QH of the high-temperature-side fusion peak in pre-expanded particles varies depending on the molecular structure of the resin. In general, the heat of fusion QH becomes smaller as the expansion temperature is raised. In a method of manufacturing the pre-expanded particles as mentioned above, if the melting point (fusion peak) of the raw material polypropylene resin particles is $T_M$(° C.), pre-expanded particles having a heat of fusion QH of not less than 0.3 cal/g can readily be obtained by setting the expansion temperature within a range of about ($T_M$–20° C.) to about ($T_M$+5° C.). Also pre-expanded particles having a heat of fusion QH of not less than 2.8 cal/g can be obtained by setting the expansion temperature within a range of about ($T_M$–25° C.) to about $T_M$. The reason for providing these ranges of expansion temperatures is to enable to select an optimum expansion temperature in accordance with the type of polypropylene resin, quantity of blowing agent used and expansion ratio of the pre-expanded particles desired.

Examples of the volatile blowing agent to be impregnated into the polypropylene resin particles in the present invention are, for instance, an aliphatic hydrocarbon such as propane, butane, pentane or hexane; an alicyclic hydrocarbon such as cyclopentane or cyclobutane; and a halogenated hydrocarbon such as trichlorotrifuoromethane, dichlorodifluoromethane, dichlorotetrafluoromethane, trichlorotrifluoroethane, methyl chloride, methylene chloride or ethyl chloride; and the like. These blowing agents may be used alone or in admixture thereof. The amount of the blowing agent used is not limited, and is suitably selected according to a desired degree of expansion of the polypropylene pre-expanded particles to be produced. In general, the blowing agent is used in an amount of 10 to 60 parts by weight per 100 parts by weight of the polypropylene resin particles. It is desirable that the bulk density of the produced polypropylene pre-expanded particles is from 10 to 20 g/liter.

In the preparation of an aqueous dispersion of polypropylene particles, a dispersing agent such as calcium tertiary phosphate, basic magnesium carbonate or calcium carbonate may be used. A small amount of a surfactant such as sodium dodecylbenzenesulfonate, sodium n-paraffinsulfonate or sodium c-olefinsulfonate may also be used as a dispersing aid. The amounts of such dispersion agent and surfactant vary depending on the kinds thereof and the kind and amount of the polypropylene particles used. Usually the amount of dispersing agent is from 0.2 to 3 parts by weight per 100 parts by weight of water, and the amount of surfactant is from 0.001 to 0.1 part by weight per 100 parts by weight of water.

The polypropylene particles to be dispersed into an aqueous dispersion medium such as water is generally used in an amount of 20 to 100 parts by weight per 100 parts by weight of water in order to achieve good dispersion into water.

Usually the polypropylene particles are introduced into a pressure vessel with water and a blowing agent to form an aqueous dispersion of the particles, and impregnated with the blowing agent at an elevated temperature, e.g., a temperature higher than the softening point of the polypropylene resin used. The dispersion of the particles containing a blowing agent is then heated under pressure to the expansion temperature in the pressure vessel, and released from the vessel into an atmosphere of lower pressure through an orifice having openings with a diameter of 2 to 10 mm, thereby pre-expanding the polypropylene particles to give the polypropylene pre-expanded particles of the present invention. The expansion temperature varies depending on the kind of polypropylene particles used and a desired value of the heat of fusion QH for the high-temperature side fusion peak of the polypropylene pre-expanded particles to be produced, so it cannot be determined unconditionally. As noted above, however, if the melting point (fusion peak) of the polypropylene particles used as measured by DSC is $T_M$(° C.), the heating temperature for the pre-expansion is selected within the range of about ($T_M$–25) to about ($T_M$)° C. when it is desired to produce pre-expanded particles having a heat of fusion QH of 2.8 to 6.0 cal/g with respect to the high-temperature side peak, and is selected within the range of about ($T_M$–20) to about ($T_M$+5)° C. when it is desired to produce pre-expanded particles having a heat of fusion QH of 0.3 to less than 2.8 cal/g with respect to the high-temperature side peak.

The expansion pressure is selected primarily according to the prescribed expansion ratio, and is generally form 10 to 50 kg/cm$^2$-G. There is no particular limitation in the pressure vessel used, and any vessel can be used so long as it can withstand the pressures and temperatures noted above. A representative vessel is an autoclave type pressure vessel.

Production of in-mold foamed articles from the pre-expanded particles of the present invention is carried out, in accordance with a conventional in-mold foaming method, by filling the polypropylene pre-expanded particles in a mold capable of closing but incapable of hermetically sealing, and heating the particles with steam or the like to fuse them together, thus giving cellular molded articles true to the mold. In the present invention, it is important, before filling the pre-expanded particles into the mold, to provide the particles with a gas pressure of at least 1.5 atms when the heat of fusion QH of the high temperature side peak of the pre-expanded particles used is from 2.8 to 6.0 cal/g, and with a gas pressure of 1.18 to 1.5 atms when the heat of fusion QH is from 0.3 to less than 2.8 cal/g. In this case, the desired gas pressure of 1.18 to 1.5 atms or of not less than 1.5 atms can be imparted to the pre-expanded particles by holding the pre-expanded particles under pressure in an inorganic gas.

The inorganic gas used in the present invention includes, for instance, air, nitrogen, helium, neon, argon or carbon dioxide gas, which may be used alone or in admixture thereof. Of these, air and nitrogen are preferable in view of versatility, cost or the like.

Figure 2:
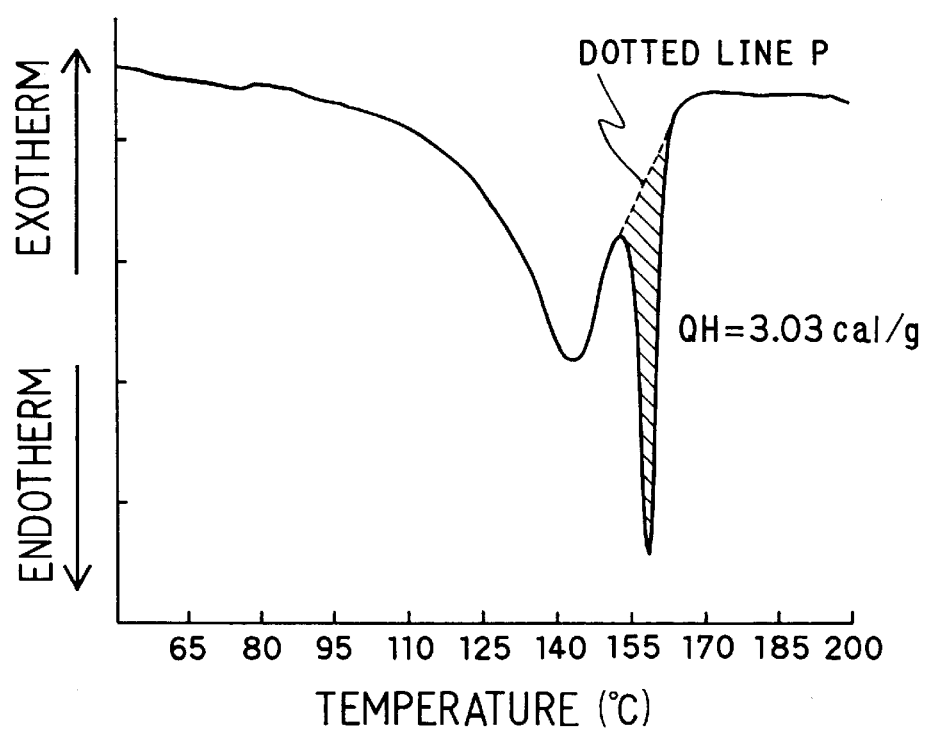
FIG. 2 is a graph illustrating a method of determining the heat of fusion QH for the peak on the higher temperature side of polypropylene re-expanded particles obtained using the polypropylene resin shown in FIG. 1.

The DSC method employed in the present invention is now described. The measuring instrument may be an ordinary differential canning calorimeter such as model DSC-2 made by Perkin-Elmer or model SSC5200 made by Seiko Electronic Industries, Ltd. In measuring the melting point (fusion peak) $T_M$(° C.) of the polypropylene particles and the heat of fusion QH of the high-temperature-side fusion peak of the pre-expanded particles, 1 to 10 mg of the polypropylene non-expanded or pre-expanded particles are used as a sample, and measurements are made at a temperature elevation speed of 10° C./minute. FIG. 1 shows an example of a result of measurement of melting point. ($T_M$) of polypropylene particles wherein the melting point $T_M$ is measured for particles of an ethylene-propylene random copolymer having an ethylene content of 2.2% by weight and a melt flow index (MI) of 10 g/10 minutes. In FIG. 2 is shown a fusion curve obtained by differential scanning calorimetry of polypropylene pre-expanded particles prepared from the polypropylene particles indicated in FIG. 1 in order to illustrate a manner of measuring the heat of fusion QH of the high-temperature-side fusion peak. Dotted line P for determining the heat of fusion QH is obtained by drawing a tangential line from the point where the slope of the curve becomes 0 between the low-temperature side peak and the high-temperature side peak to the curve at the point where the high-temperature side peak ends.

The present invention is more specifically described and explained by means of examples and comparative examples, in which all parts are by weight unless otherwise noted. It is to be understood that the present invention is in no way limited to or by these examples. In the examples, measurement of properties was made according to the following methods.

(1) Weight per particle:

A random sampling of 100 polypropylene pre-expanded articles was taken, the weight of each particle was measured, and the mean value thereof was taken as the weight per particle of the pre-expanded particles.

(2) Mean Cell Diameter:

A random sampling of 10 polypropylene pre-expanded particles was taken, the cross-section of each particle was observed under microscope, the number of cells on a straight line having a length of 2 mm was counted, and from the mean value thereof the mean cell diameter was calculated according to the following equation.

Mean cell diameter ($\mu$m)=[2/(mean number of cells on 10 particles)]×1000

(3) Cooling Time:

In molding of pre-expanded particles in a mold, after the steam heating was finished, the time (in seconds) required for the pressure of the molded article surface against the mold surface (molded article surface pressure) to decrease to 0.3 kg/cm$^2$-G was measured.

(4) Dimensional Shrinkage:

The dimensions of a molded article were measured using a caliper, the shrinkage percentage relative to the mold dimensions was calculated, and evaluation was made according to the following criteria:

⊚: shrinkage percentage of less than 3%

○: shrinkage percentage of 3% to less than 4%

Δ: shrinkage percentage of 4% to less than 5%

X: shrinkage percentage of not less than 5%

(5) Rate of Melt Adhesion of Particles:

After forming a notch with a knife in the surface of a molded article to a depth of approximately 5 mm, the molded article was split long the line of the notch by bending the molded article. The broken surface was observed and the percentage of broken particles to the whole particles (rate of melt adhesion) was obtained. Evaluation was made according to the following criteria:

⊚: melt adhesion rate of at least 80%

○: melt adhesion rate of 60% to less than 80%

Δ: melt adhesion rate of 50% to less than 60%

X: melt adhesion rate of less than 50%

A melt adhesion rate of at least 60% is usually satisfactory for molded articles.

(6) Surface Appearance:

The surface of a molded article was visually observed and evaluated according to the following criteria:

⊚: There is no irregularity in the surface and there is little gap between particles.

○: There is no irregularity in the surface, but there are slight gaps between particles.

Δ: There is no irregularity in the surface, but there are conspicuous gaps between particles.

X: There is an irregularity in the surface and the gaps between respective particles are very large.

EXAMPLE 1

A pressure vessel was charged with 100 parts of pellets of an ethylene-propylene random copolymer (ethylene content 2.2% by weight, MI 10 g/ 10 minutes) having a weight of about 0.9 to about 2.3 mg per a pellet and a melting point $T_M$ of 146.0° C. measured by DSC, 20 to 40 parts of isobutane and, as a dispersing agent, 2.0 parts of powdery basic calcium tertiary phosphate and 0.08 part of sodium n-paraffinsulfonate, and 300 parts of water. The resulting aqueous dispersion was heated to a prescribed temperature of 130 to 136° C. The pressure inside the vessel at that time was approximately 20 to 23 kg/cm$^2$-G. The pressure inside the vessel was then adjusted to a prescribed expansion pressure of 21 to 28 kg/cm$^2$-(G by introducing isobutane to the vessel. Once the prescribed expansion pressure was reached, while maintaining the pressure inside the vessel at that pressure, a valve provided at a lower part of the pressure vessel was opened to release the dispersion into atmospheric pressure through an orifice plate having openings therein of 4.4 mm diameter, thereby performing expansion. The thus obtained pre-expanded particles had an expansion ratio of 28.0 to 55.0. The heat of fusion QH of the high-temperature-side fusion peak of the pre-expanded particles as measured by DSC is shown in Table 1.

The pre-expanded particles were placed in a pressure vessel, and allowed to stand for 16 hours at 25° under an air pressure of 2.5 kg/cm$^2$-G in order to impart an expandability to the particles. The particles were taken out into atmospheric pressure and allowed to stand for 5 to 80 minutes to adjust the internal pressure in the particles to the pressure indicated in Table 1. The particles were then filled in a block mold having a size of 320×320×60 mm, and heat-molded by heating with steam of about 2.8 to 3.5 kg/cm$^2$-G to yield in-mold foamed articles. The density, dimensional shrinkage percentage, melt adhesion rate and surface appearance of the obtained molded articles were evaluated. The results are shown in Table 1.

TABLE 1

| | Pre-expanded particles | | | | Molding | | Molded article | | | |
|---|---|---|---|---|---|---|---|---|---|---|
| | Weight per particle (mg) | Mean cell diameter (μm) | Heat of fusion on high temp. side (cal/g) | Bulk density (g/liter) | Internal pressure of particles (atm) | Cooling time (second) | Density (g/liter) | Dimensional shrinkage percentage | Melt adhesion rate | Surface appearance |
| Ex. 1-1 | 1.25 | 154 | 3.03 | 16.5 | 1.6 | 16 | 20.3 | ○ | ◎ | ○ |
| Ex. 1-2 | 1.25 | 140 | 3.00 | 11.0 | 1.6 | 12 | 13.5 | ○ | ◎ | ○ |
| Ex. 1-3 | 1.25 | 128 | 3.20 | 17.8 | 1.6 | 10 | 23.0 | ○ | ○ | ○ |
| Ex. 1-4 | 0.40 | 120 | 3.10 | 17.0 | 1.6 | 9 | 21.0 | ○ | ○ | ○ |
| Ex. 1-5 | 1.75 | 130 | 3.05 | 16.5 | 1.6 | 12 | 20.5 | ○ | ○ | ○ |
| Ex. 1-6 | 1.25 | 154 | 3.03 | 16.5 | 1.4 | 5 | 21.0 | Δ | ○ | ○ |
| Com. Ex. 1-1 | 2.30 | 135 | 3.25 | 17.5 | 1.6 | 20 | 22.0 | ○ | ○ | x |
| Com. Ex. 1-2 | 1.25 | 285 | 2.53 | 16.8 | 1.6 | 56 | 20.0 | Δ | Δ | Δ |

EXAMPLE 2

A pressure vessel was charged with 100 parts of pellets of an ethylene-propylene random copolymer (ethylene content 2.2% by weight, MI 10 g/ 10 minutes) having a weight of about 0.4 to about 2.3 mg per a pellet and a melting point TM of 146.0° C. measured by DSC, 20 to 40 parts of isobutane and, as a dispersing agent, 2.0 parts of powdery basic calcium tertiary phosphate and 0.08 part of sodium n-paraffinsulfonate, and 300 parts of water. The resulting aqueous dispersion was heated to a prescribed temperature of 130 to 136° C. The pressure inside the vessel at that time was approximately 20 to 23 kg/cm²-G. The pressure inside the vessel was then adjusted to a prescribed expansion pressure of 21 to 25 kg/cm²-G by introducing isobutane to the vessel. Once the prescribed expansion pressure was reached, while maintaining the pressure inside the vessel at that pressure, a valve provided at a lower part of the pressure vessel was opened to release the dispersion into atmospheric pressure through an orifice plate having openings therein of 4.4 mm diameter, thereby performing expansion. The thus obtained pre-expanded particles had an expansion ratio of 25.0 to 55.0. The heat of fusion QH of the high-temperature-side fusion peak of the pre-expanded particles as measured by DSC is shown in Table 2.

The pre-expanded particles were placed in a pressure vessel, and allowed to stand for 16 hours at 25° under an air pressure of 2.5 kg/cm²-G in order to impart an expandability to the particles. The particles were taken out into atmospheric pressure and allowed to stand for 60 to 90 minutes to adjust the internal pressure in the particles to 1.45 atms. The particles were then filled in a block mold having a size of 320×320×60 mm, and heat-molded by heating with steam of about 2.8 to 3.3 kg/cm²-G to yield in-mold foamed articles which had no problem in melt adhesion and surface appearance. The density, dimensional shrinkage percentage, melt adhesion rate and surface appearance of the obtained molded articles were evaluated. The results are shown in Table 2.

TABLE 2

| | Pre-expanded particles | | | | Molding | | Molded article | | | |
|---|---|---|---|---|---|---|---|---|---|---|
| | Weight per particle (mg) | Mean cell diameter (μm) | Heat of fusion on high temp. side (cal/g) | Bulk density (g/liter) | Internal pressure of particles (atm) | Cooling time (second) | Density (g/liter) | Dimensional shrinkage percentage | Melt adhesion rate | Surface appearance |
| Ex. 2-1 | 0.86 | 174 | 2.44 | 15.1 | 1.45 | 40 | 18.6 | ◎ | ◎ | ◎ |
| Ex. 2-2 | 0.40 | 180 | 2.30 | 15.2 | 1.45 | 35 | 18.5 | ◎ | ◎ | ◎ |
| Ex. 2-3 | 1.31 | 114 | 2.46 | 15.1 | 1.45 | 36 | 18.7 | ○ | ◎ | ◎ |
| Ex. 2-4 | 1.31 | 141 | 2.34 | 15.5 | 1.45 | 41 | 18.4 | ○ | ◎ | ○ |
| Ex. 2-5 | 1.28 | 185 | 2.53 | 16.8 | 1.45 | 36 | 20.0 | ◎ | ◎ | ○ |
| Ex. 2-6 | 1.75 | 130 | 2.10 | 9.0 | 1.45 | 16 | 15.9 | Δ | ◎ | ○ |
| Ex. 2-7 | 1.75 | 140 | 2.05 | 10.7 | 1.45 | 25 | 16.1 | Δ | ◎ | ○ |
| Ex. 2-8 | 1.75 | 200 | 2.41 | 14.8 | 1.45 | 46 | 18.1 | ◎ | ◎ | ◎ |
| Ex. 2-9 | 1.75 | 190 | 2.39 | 19.5 | 1.45 | 40 | 24.0 | ◎ | ◎ | ◎ |
| Com. Ex. 2-1 | 1.28 | 265 | 2.34 | 15.9 | 1.45 | 60 | 19.3 | Δ | Δ | Δ |
| Com. Ex. 2-2 | 2.28 | 235 | 2.53 | 16.0 | 1.45 | 65 | 19.5 | Δ | Δ | x |
| Com. Ex. 2-3 | 1.25 | 92 | 3.75 | 16.6 | 1.45 | 5 | 25.0 | x | Δ | x |

As apparent from the results shown in Tables 1 and 2, according to the present invention, the cooling time in molding processing can be shortened as compared to conventional polypropylene pre-expanded particles without deteriorating the properties of the obtained foamed articles and, moreover, it is possible to provide in-mold foamed articles having a low density of 25 g/liter or less.

In addition to the ingredients used in the Examples, other ingredients can be used in the Examples as set forth in the specification to obtain substantially the same results.

What we claim is:

1. A pre-expanded particle of a polypropylene resin having a weight of 0.3 to 1.25 mg per particle, an average cell diameter of 250 μm or less and a bulk density of 10 to 20 g/liter, wherein said pre-expanded particle shows two fusion peaks on a differential scanning calorimetry (DSC) curve when measured by differential scanning calorimetry, and the heat of fusion QH of the peak appearing on a higher temperature side is from 2.8 to 6.0 cal/g.

2. The pre-expanded particle of claim 1, wherein said polypropylene resin comprises a polymer having at least 80% by weight of propylene.

3. The pre-expanded particle of claim 1 wherein said polypropylene resin comprises an ethylene-propylene random copolymer.

4. The pre-expanded particle of claim 1, wherein the difference between temperatures at which said two fusion peaks appear is from 10 to 25° C.

5. The pre-expanded particle of claim 1, wherein the heat of fusion QH of the peak appearing on a higher temperature side is from 3.00 to 3.20 cal/g.

6. The pre-expanded particle of claim 1, which has a weight of 0.40 to 1.25 mg per particle.

7. A pre-expanded particle of a polypropylene resin having a weight of 0.3 to 1.31 mg per particle, an average cell diameter of 250 μm or less, and a bulk density of 10 to 20 g/liter, wherein said pre-expanded particle shows two fusion peaks on a differential scanning calorimetry (DSC) curve when measured by differential scanning calorimetry, and the heat of fusion QH of the peak appearing on a higher temperature side is from 0.3 cal/g to less than 2.8 cal/g.

8. The pre-expanded particle of claim 7, wherein said polypropylene resin comprises a polymer having at least 80% by weight of propylene.

9. The pre-expanded particle of claim 7, wherein said polypropylene resin comprises an ethylene-propylene random copolymer.

10. The pre-expanded particle of claim 7, wherein the difference between temperatures at which said two fusion peaks appear is from 10 to 25° C.

11. The pre-expanded particle of claim 7, which has a weight of 0.40 to 1.31 mg per particle.

* * * * *